United States Patent [19]
Genz et al.

[11] Patent Number: 4,999,414
[45] Date of Patent: * Mar. 12, 1991

[54] PROCESS FOR THE PRODUCTION OF AROMATIC POLYETHER KETONES

[75] Inventors: Joachim Genz; Erhard Tresper; Karsten-Josef Idel; Ludwig Bottenbruch; Volker Eckhardt, all of Krefeld, Fed. Rep. of Germany

[73] Assignee: Bayer Aktiengesellschaft, Leverkusen, Fed. Rep. of Germany

[ * ] Notice: The portion of the term of this patent subsequent to Sep. 4, 2007 has been disclaimed.

[21] Appl. No.: 381,048

[22] Filed: Jul. 17, 1989

[30] Foreign Application Priority Data

Jul. 23, 1988 [DE] Fed. Rep. of Germany ....... 3825149
Dec. 2, 1988 [DE] Fed. Rep. of Germany ....... 3840617

[51] Int. Cl.$^5$ .................. C08G 8/02; C08G 65/38
[52] U.S. Cl. .................. 528/125; 528/126; 528/128; 528/219
[58] Field of Search ............. 528/125, 126, 128, 219

[56] References Cited

U.S. PATENT DOCUMENTS

| 3,809,682 | 5/1974 | Studinka et al. | 528/174 |
| 4,010,147 | 3/1977 | Rose | 528/125 |
| 4,113,699 | 9/1978 | Rose et al. | 528/125 |

FOREIGN PATENT DOCUMENTS

| 0243833 | 11/1987 | European Pat. Off. . |
| 0307710 | 3/1989 | European Pat. Off. . |
| 2436167 | 2/1975 | Fed. Rep. of Germany . |

Primary Examiner—John Kight, III
Assistant Examiner—P. Hampton Hightower
Attorney, Agent, or Firm—Connolly and Hutz

[57] ABSTRACT

The invention relates to a process for the production of crystalline, aromatic polyether ketones in lactams as solvent. The polymers produced have a high molecular weight, high thermal stability, high resistance to the effect of chemicals and good mechanical properties.

4 Claims, No Drawings

PROCESS FOR THE PRODUCTION OF AROMATIC POLYETHER KETONES

This invention relates to a process for the production of crystalline, aromatic polyether ketones in lactams as solvent. The polymers thus produced have a high molecular weight, high thermal stability, high resistance to the effect of chemicals and favorable mechanical properties.

Crystalline, aromatic polyether ketones are known. They may be prepared, for example, by reaction of a dialkali metal salt of a bisphenol with a dihalogen compound containing a keto group in the presence of an aromatic sulfone at 250° to 400° C. (cf. for example U.S. Pat. No. 4 010 147, EP-A 1879) or by reaction of a halogen phenol containing keto groups with an alkali metal carbonate in N-methyl pyrrolidone, an aliphatic sulfone or an aromatic sulfone at 200° to 400° C. (cf. for example U.S. Pat. No. 4,113,699).

It is a disadvantage of these processes that only special dihalogene ketocompounds can be used, e.g. difluorobenzophenone for the production of polymers. These compounds can only be manufactured with high expense and are therefore not economic.

It is known from DE-A 2,220,079 that aromatic polyether and polythioether can be produced from aromatic dihalogen compounds and aromatic dihydroxy compounds in $C_1$–$C_4$ alkyl lactams as solvent.

In order to obtain high molecular weight, crystalline, aromatic polyether ketones, it is of advantage to use a solvent which dissolves the polymers formed. Crystalline polyether ketones are normally insoluble in standard solvents. The solvent used in the production process should be polar so that polymers of high molecular weight can be formed during the condensation reaction. In addition, it should be thermally stable because the reaction is normally carried out at high temperatures.

Known solvents for the production of polyether ketones are, for example, aliphatic sulfones, aromatic sulfones, N-methyl pyrrolidone. However, even these solvents are not entirely satisfactory for the synthesis of high molecular weight, crystalline, aromatic polyether ketones. If, for example, an aliphatic sulfone is used as solvent, the reaction can be accompanied by unwanted effects; such as gelation of the reaction mixture or discoloration. Despite very high reaction temperatures, the reaction times are long.

It has now been found that crystalline, aromatic polyether ketones of high molecular weight can be produced if certain N-substituted lactams are used as solvent. The aromatic polyether ketones produced are soluble in the N-substituted lactams used.

Accordingly, the present invention relates to a process for the production of crystalline, aromatic polyether ketones from aromatic dihydroxy compounds and aromatic dihalogen compounds containing at least one keto group or aromatic monohydroxy monohalogen compounds containing at least one keto group, optionally in the presence of alkali compounds, characterized in that N-substituted lactams corresponding to formula (I)

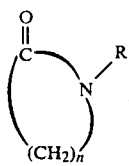

in which
R represents $C_2$–$C_{10}$ alkyl, $C_5$–$C_{24}$ cycloalkyl, $C_5$–$C_{18}$ aryl, $C_7$–$C_{25}$ alkylaryl, $C_7$–$C_{25}$ arylalkyl and
n is the number 3, 4 and 5,
are used as the solvent.

If the index n = 5, R stands for ethyl, n-propyl, isopropyl, n-butyl, sec.-butyl, tert.-butyl, $C_5$–$C_{10}$ alkyl, $C_5$–$C_{24}$-cycloalkyl, $C_6$–$C_{18}$-aryl, $C_7$–$C_{25}$ alkylaryl and $C_7$–$C_{25}$-arylalkyl.

The production of the polyether ketones in accordance with the invention may be carried out, for example, by reaction of substantially equivalent quantities of an aromatic dihydroxy compound containing free hydroxyl groups with aromatic dihalogen keto compounds in an N-substituted lactam in the presence of an alkali compound (reaction type (1) or by polymerization of monohydroxy monohalogen compounds containing a free hydroxyl group in an N-substituted lactam in the presence of an alkali compound (reaction type (2) or by reaction of alkali salts of aromatic dihydroxy compounds with aromatic dihalogen keto compounds in an N-substituted lactam (reaction type 3) or by reaction of alkali salts of a monohydroxy monohalogen compound in an N-substituted lactam (reaction type 4).

Dihydroxy compounds suitable for reactions 1, 2 and 3 are divalent phenols corresponding to formula (II)

in which
Ar represents aromatic $C_6$–$C_{30}$ radicals, and alkali (alkaline earth) salts thereof (for example Na, K salts).

Aromatic dihydroxy compounds suitable for the reaction are, for example, mononuclear divalent phenols, for example hydroquinone; polynuclear dihydroxy compounds, for example 4,4'-dihydroxydiphenyl; bisphenols, for example 2,2-bis-(4-hydroxyphenyl)-propane, bis-(4-hydroxyphenyl)-methane, 4,4'-dihydroxybenzophenone, 4,4'-dihydroxydiphenyl ether, 4,4'-dihydroxydiphenylsulfide, 1,4-bis-(4-hydroxybenzoyl)-benzene and 1,3-bis-(4-hydroxybenzoyl)-benzene and derivatives thereof substituted in the nucleus (for example by halogen, such as Cl, Br, $C_1$–$C_4$ alkyl). They may be used individually or in admixture.

4,4'-Dihydroxydiphenyl ether, hydroquinone and 4,4'-dihydroxybenzophenone are preferred.

Aromatic dihalogen keto compounds suitable for reactions 1, 2 and 3 correspond to formula (III)

in which
Ar is an aromatic $C_6$–$C_{30}$ radical containing at least one keto group and
X represents halogen (for example F, Cl, Br) which is attached to the last aromatic nucleus in the ortho or para position.

Preferred aromatic dihalogen keto compounds correspond to formulae (IV), (V) and (VI)

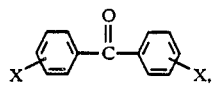  (IV)

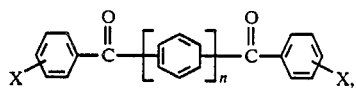  (V)

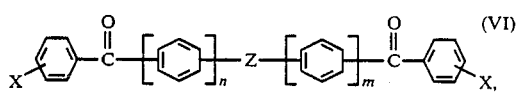  (VI)

in which

X represents halogen (F, Cl, Br) attached to the last aromatic nucleus in the ortho or para position; one group X may have to be an OH group (reaction 4), Z represents an ether group, a thioether group, a carbonyl group or a sulfone group and m and n stand for the numbers 1, 2 and 3.

If the reaction is carried out by reaction type 4, one X in formulae IV, V and VI is an OH group (formulae IVa, Va, VIa) and, optionally, alkali (alkaline earth) salts thereof (for example Na, K salt).

Aromatic dihalogen keto compounds suitable for the reaction are, for example, 4,4'-difluorobenzophenone, 4,4'dichlorobenzophenone, 2,4'-dichlorobenzophenone, bis-1,4-(4-fluorobenzoyl)-benzene, bis-1,4-(4-chlorobenzoyl)-benzene, bis-1,3-(4-chlorobenzoyl)-benzene, bis-4,4'-(4-fluorobenzoyl)-biphenyl, bis-4,4'-(4-chlorobenzoyl)-biphenyl, bis-4,4'-(4-chlorobenzoyl)-biphenyl, bis-4,4'-(4-fluorobenzoyl)-diphenyl ether, bis-4,4,-(4-chlorobenzoyl)diphenyl ether, etc. They may be used individually or in admixture.

Preferred dihalogen keto compounds corresponding to formula (III) preferably have a halogen atom in the para position on the last aromatic nucleus.

The preferred halogen is chlorine.

Particularly preferred aromatic dihalogen keto compounds are 4,4,-dichlorobenzophenone and bis-1,4-(4-chlorobenzoyl)-benzene.

Monohydroxy monohalogen compounds of formulae IVa, Va and VIa suitable for the reaction may be represented by the formula (VII)

X—Ar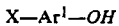—OH        (VII), in which

Ar[1] and X are as defined for formula (III).

Instead of using the compounds containing free hydroxyl groups corresponding to formulae II and VII, it is also possible to use alkali (alkaline earth) salts (for example Na, K salts) thereof in all four reaction types.

Monohydroxy monohalogen compounds suitable for the reaction are, for example, 4-fluoro-4'-hydroxybenzophenone, 4-chloro-4'-hydroxybenzophenone, 4-(4-fluorobenzoyl)-4'-hydroxybiphenyl, 4-(4-chlorobenzoyl)-4'-fluorobenzoyl)-4,-hydroxydiphenyl ether, 4-(4-chlorobenzoyl)-4'-hydroxydiphenyl ether, 4-fluoro-4''-hydroxyterephthalophenone, 4-chloro-4''-hydroxyterephthalophenone, 4-fluoro-4''-hydroxyisophthalophenone, 4-chloro-4''-hydroxyisophthalophenone, etc., and alkali salts thereof.

They may be used individually or in admixture. Their alkali metal salts are obtained by the usual methods, for example by reaction of the free hydroxyl groups with alkali hydroxides.

The preferred halogen in formulae IV, V, VI and VII is chlorine.

A preferred monohydroxy monohalogen compound is 4-chloro-4'-hydroxybenzophenone or the alkali (alkaline earth) metal salt (Na, K salt) thereof.

According to the invention, the solvent used is an N-substituted lactam corresponding to formula (I), for example N-ethyl pyrrolidone, N-n-propyl pyrrolidone, N-isopropyl pyrrolidone, N-tert.-butyl pyrrolidone, N-cyclohexyl pyrrolidone, N-isooctyl pyrrolidone, N-benzyl pyrrolidone, N-phenyl pyrrolidone, N-ethyl caprolactam, N-n-propyl caprolactam, N-isopropyl caprolactam, N-tert.-butyl caprolactam, N-cyclohexyl caprolactam, N-isooctyl caprolactam, N-benzyl caprolactam, N-phenyl caprolactam, etc.

The solvents used in accordance with the invention have melting points below room temperature, i.e. may be handled as liquids. They have a very high boiling point, very good thermal stability and are highly polar. They should preferably be capable of dissolving the aromatic polyether ketone formed.

According to the invention, it is also possible to react aromatic dichloroketo compounds of low reactivity to form polyether ketones of high molecular weight, excellent color and high thermal stability.

The solvents may be used individually or in admixture.

The reaction of an aromatic dihydroxy compound with an aromatic dihaloketo compound or the reaction of a monohydroxy monohaloketo compound containing free hydroxyl groups to form crystalline, aromatic polyether ketones, is carried out in the presence of an alkali compound.

The reaction of the alkali metal salts of the dihydroxy compound may be carried out without the addition of an alkali compound.

Alkali compounds suitable for the reaction are, for example, hydroxides, carbonates, bicarbonates, fluorides, hydrides, $C_1$–$C_{10}$ alkoxides and $C_1$–$C_5$ alkylates of alkali metals (Li, Na, K). Preferred alkali compounds are carbonates and bicarbonates. The preferred alkali metal is potassium.

The reaction of aromatic dihydroxy compounds corresponding to formula (II) with aromatic dihaloketo compounds corresponding to formula (III) and the reaction of aromatic monohydroxy monohalogen compounds corresponding to formula (VII) containing free hydroxyl groups to form crystalline, aromatic polyether ketones is carried out by dissolving the reaction components in the solvent of formula (I) in the presence of the alkali compound, gradually heating the reaction mixture to approximately 120°–200° C., removing the water of reaction formed at that temperature by an added azeotropic entraining agent, subsequently removing the azeotropic entraining agent by distillation by increasing the reaction temperature and, finally, heating the reaction mixture to temperatures of 200° to 400° C. and maintaining that temperature for 0.1 to 24 hours. To obtain high molecular weights, the reaction of aromatic dihydroxy compounds with aromatic dihalogen compounds is carried out using substantially equimolar quantities of the reaction components. It may be advisable to use one of the reaction components in excess, for example where it is desired to obtain lower molecular weights.

In the reaction of the aromatic dihydroxy compounds containing free hydroxyl groups with aromatic dihaloketo compounds and in the reaction of monohydroxy monohalogen compounds containing free hydroxyl groups to form aromatic polyether ketones, the alkali compounds are used in substantially equivalent quantities to the hydroxyl groups. 1.0 to 1.2 val alkali compounds are preferably used per val free hydroxyl groups.

The azeotropic entraining agents used are those which form an azeotrope with water and which preferably have a lower boiling point than the solvent used in accordance with the invention, for example benzene, toluene, xylene. Toluene is preferred.

The reaction of alkali metal salts of the free hydroxyl groups of the aromatic dihydroxy compounds with aromatic dihaloketo compounds and the reaction of the alkali metal salts of the free hydroxyl groups of the aromatic dihydroxy compounds with aromatic dihaloketo compounds and the reaction of the alkali metal salts of the free hydroxyl groups of the monohydroxy monohaloketo compounds to form aromatic polyether ketones is carried out analogously to the reaction of the reaction components containing free hydroxyl groups, optionally without the addition of an azeotropic entraining agent and an alkali compound.

In reaction types 1, 2, 3 and 4, the reaction temperatures are in the range from 180° to 400° C. and preferably in the range from 200° to 280° C. The reaction times are between 0.1 and 24 h and preferably between, 0.5 and 4 h.

The aromatic polyether ketones prepared in accordance with the invention have high molecular weights and a relative viscosity of > 1.2, preferably of 1,2 to 2,8 (as measured in sulfuric acid in a concentration of 1 g/100 ml). The relative viscosity may be calculated in accordance with the following equation $$\eta_{rel} = \frac{\eta}{\eta_o}$$

where $\eta_o$ is the viscosity of the solvent used, $\eta$ is the viscosity of the polymer solution and $\eta_{rel}$ is the relative viscosity.

The highly crystalline, aromatic polyether ketones prepared by the process according to the invention show excellent thermal stability, excellent resistance to chemicals and favorable mechanical properties. They may be processed into moldings, films, fibers and surface coatings and may be mixed with other polymers, with fillers, for example glass fibers, carbon fibers, aramide fibers, calcium carbonate, calcium silicate, etc.

EXAMPLES

Example 1

1.0 Mol 4,4'-dichlorobenzophenone, 1.0 mol hydroquinone, 1200 ml N-ethyl pyrrolidone, 360 ml toluene and 1.2 mol $K_2CO_3$ are introduced into a 3000 ml three-necked round-bottomed flask equipped with a glass stirrer and a water separator with a reflux condenser and thermometer. The reaction mixture is heated with stirring. The water of reaction formed is removed at an internal temperature of up to 200° C. This operation lasts 1 to 5 hours. After removal of the water of reaction, the reaction mixture is heated to approximately 210° C. and stirred for about another 90 minutes.

To coagulate the polymer formed, the reaction mixture is precipitated while still hot in a 10% aqueous phosphoric acid solution. The polymer precipitated is then filtered off and suspended repeatedly in water until it is free from electrolyte. To remove any residual solvent present, the polymer is then thoroughly boiled with methanol, filtered and dried. The yield comprises more than 93% of the theoretical.

The relative viscosity $\eta_{rel}$ of the dried product is determined in 100% sulfuric acid in a concentration of 1 g/100 ml and was found to be 1.212.

Example 2

1 0 Mol 4,4'-dichlorobenzophenone, 1.0 mol hydroquinone, 1200 ml N-benzyl pyrrolidone, 360 ml toluene and 1.2 mol $K_2CO_3$ are introduced into a 3000 ml three-necked, round-bottomed flask equipped with a glass stirrer and water separator with a reflux condenser and thermometer. The reaction takes place as in Example 1.

A polyether ketone having a relative viscosity $\eta_{rel}$ of 1.227 is obtained.

Example 3

1.0 Mol 4,4'-dichlorobenzophenone, 1.0 mol hydroquinone, 1200 ml N-phenyl pyrrolidone, 360 ml toluene and 1.2 mol $K_2CO_3$ are weighed into a reaction apparatus according to Example 1. The reaction takes place as in Example 1. The polyether ketone obtained has a relative viscosity $\eta_{rel}$ of 1.214.

Example 4

Example 1 is repeated, N-methyl caprolactam is used as solvent. The polyether ketone obtained has a relative viscosity $\eta_{rel}$ of 1.280.

We claim:

1. A process for the production of crystalline, aromatic polyether ketones from aromatic dihydroxy compounds and aromatic dihalogen compounds containing at least one keto group or aromatic monohydroxy monohalogen compounds containing at least one keto group, optionally in the presence of alkali compounds, characterized in that N-substituted lactams corresponding to formula (I)

in which

R represents $C_2-C_{10}$ alkyl, $C_5-C_{24}$ cycloalkyl, $C_6-C_{18}$ aryl, $C_7-C_{25}$ alkylaryl, $C_7-C_{25}$ arylalkyl and n is the number 3, 4 and 5, are used as the solvent.

2. A process according to claim 1 wherein R is an ethyl, n-propyl, iso-propyl, n-butyl, sec-butyl or tert-butyl group and n is 5.

3. A process according to claim 1 wherein said lactam is a pyrrolidone and R is ethyl, n-proyl, isopropyl, tert-butyl, cyclohexyl, isooctyl, benzyl or phenyl.

4. A process according to claim 1 wherein said lactam is a caprolactam and R is ethyl, n-propyl, isopropyl, tert-butyl, cyclohexyl, isooctyl, benzyl or phenyl.

* * * * *